United States Patent
Bennison et al.

(10) Patent No.: US 11,073,036 B2
(45) Date of Patent: Jul. 27, 2021

(54) BOAS FLOW DIRECTING ARRANGEMENT

(71) Applicant: United Technologies Corporation, Farmington, CT (US)

(72) Inventors: Matthew James Bennison, Kittery, ME (US); Paul M. Lutjen, Kennebunkport, ME (US); Ken F. Blaney, Middleton, NH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 63 days.

(21) Appl. No.: 16/429,694

(22) Filed: Jun. 3, 2019

(65) Prior Publication Data

US 2020/0378269 A1 Dec. 3, 2020

(51) Int. Cl.
*F01D 11/08* (2006.01)
*F01D 25/12* (2006.01)

(52) U.S. Cl.
CPC .............. *F01D 11/08* (2013.01); *F01D 25/12* (2013.01); *F05D 2240/11* (2013.01); *F05D 2260/202* (2013.01); *F05D 2260/2212* (2013.01)

(58) Field of Classification Search
CPC ...... F01D 11/08; F01D 25/12; F05D 2240/11; F05D 2260/202; F05D 2260/2212
See application file for complete search history.

(56) References Cited

U.S. PATENT DOCUMENTS

| | | | | |
|---|---|---|---|---|
| 7,306,424 | B2 * | 12/2007 | Romanov | F01D 11/08 415/115 |
| 9,103,225 | B2 * | 8/2015 | Lutjen | F01D 1/02 |
| 10,196,917 | B2 | 2/2019 | Lutjen et al. | |
| 10,202,864 | B2 * | 2/2019 | Clum | F01D 25/12 |
| 10,221,767 | B2 * | 3/2019 | Romanov | F01D 9/041 |
| 10,677,084 | B2 * | 6/2020 | Smoke | F01D 25/12 |
| 10,690,055 | B2 * | 6/2020 | Stover | F01D 9/041 |
| 2016/0123186 | A1 * | 5/2016 | Stover | F01D 11/24 415/116 |
| 2017/0101932 | A1 * | 4/2017 | Stover | F01D 11/08 |
| 2020/0149429 | A1 * | 5/2020 | Ennacer | F01D 25/12 |

* cited by examiner

*Primary Examiner* — Brian P Wolcott
(74) *Attorney, Agent, or Firm* — Carlson, Gaskey & Olds, P.C.

(57) ABSTRACT

A gas turbine engine component includes a main body. A cooling passage is within the main body. The cooling passage is defined by a first wall opposite a second wall. The cooling passage has an inlet on the second wall. A protrusion is formed on the first wall arranged across from the inlet.

18 Claims, 5 Drawing Sheets

BOAS FLOW DIRECTING ARRANGEMENT

BACKGROUND

This application relates to cooling flow directing features of a gas turbine engine component, such as a blade outer air seal.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

Internal cooling passages may be arranged within the blade outer air seal, with the internal passages including inlet holes, exit holes and trip strips on a hot side of the internal passage. The hot side of the internal passage is the side of the passage facing the annular flow path.

SUMMARY OF THE INVENTION

In one exemplary embodiment, a gas turbine engine component includes a main body. A cooling passage is within the main body. The cooling passage is defined by a first wall opposite a second wall. The cooling passage has an inlet on the second wall. A protrusion is formed on the first wall arranged across from the inlet.

In a further embodiment of the above, the first wall is a radially inner wall and the second wall is a radially outer wall.

In a further embodiment of any of the above, the protrusion extends inward relative to the cooling passage.

In a further embodiment of any of the above, the protrusion comprises a ramp feature having a sloped surface.

In a further embodiment of any of the above, the cooling passage defines an upstream end and a downstream end. The ramp feature is configured to direct cooling fluid towards the upstream end.

In a further embodiment of any of the above, the sloped surface faces toward the upstream end.

In a further embodiment of any of the above, a wall extends along a length of the ramp feature.

In a further embodiment of any of the above, the wall extends downstream of the ramp feature.

In a further embodiment of any of the above, the inlet is arranged on a dome on the second wall. The dome extends outward relative to the cooling passage.

In a further embodiment of any of the above, the dome has a first height and the protrusion has a second height. The first height is substantially the same as the second height.

In a further embodiment of any of the above, a cooling passage height between the first and second walls is at least 0.050 inches (1.27 mm).

In a further embodiment of any of the above, a plurality of turbulators are arranged on one of the first and second walls downstream of the protrusion.

In a further embodiment of any of the above, the component is a blade outer air seal.

In another exemplary embodiment, a turbine section for a gas turbine engine includes a turbine blade that extends radially outwardly to a radially outer tip and for rotation about an axis of rotation. A blade outer air seal has a plurality of segments mounted in a support structure. The plurality of segments are arranged circumferentially about the axis of rotation and radially outward of the outer tip. At least one of the segments have an internal cooling passage defined by a first wall opposite a second wall. The internal cooling passage has an inlet on the second wall and a protrusion formed in the first wall across from the inlet.

In a further embodiment of any of the above, the first wall is a radially inner wall. The second wall is a radially outer wall.

In a further embodiment of any of the above, the inlet is arranged on a dome on the second wall. The dome extends outward relative to the cooling passage.

In a further embodiment of any of the above, the dome extends a first height from the second wall. The protrusion extends a second height from the first wall. The first height is about the same as the second height.

In a further embodiment of any of the above, the first and second heights are between about 0.03 and 0.05 inches (0.762-1.27 mm).

In a further embodiment of any of the above, the inlet is arranged near a leading edge of at least one segment.

In a further embodiment of any of the above, the cooling passage defines an upstream end and a downstream end. The protrusion is a ramp feature configured to direct cooling fluid towards the upstream end.

DETAILED DESCRIPTION

Figure 1:
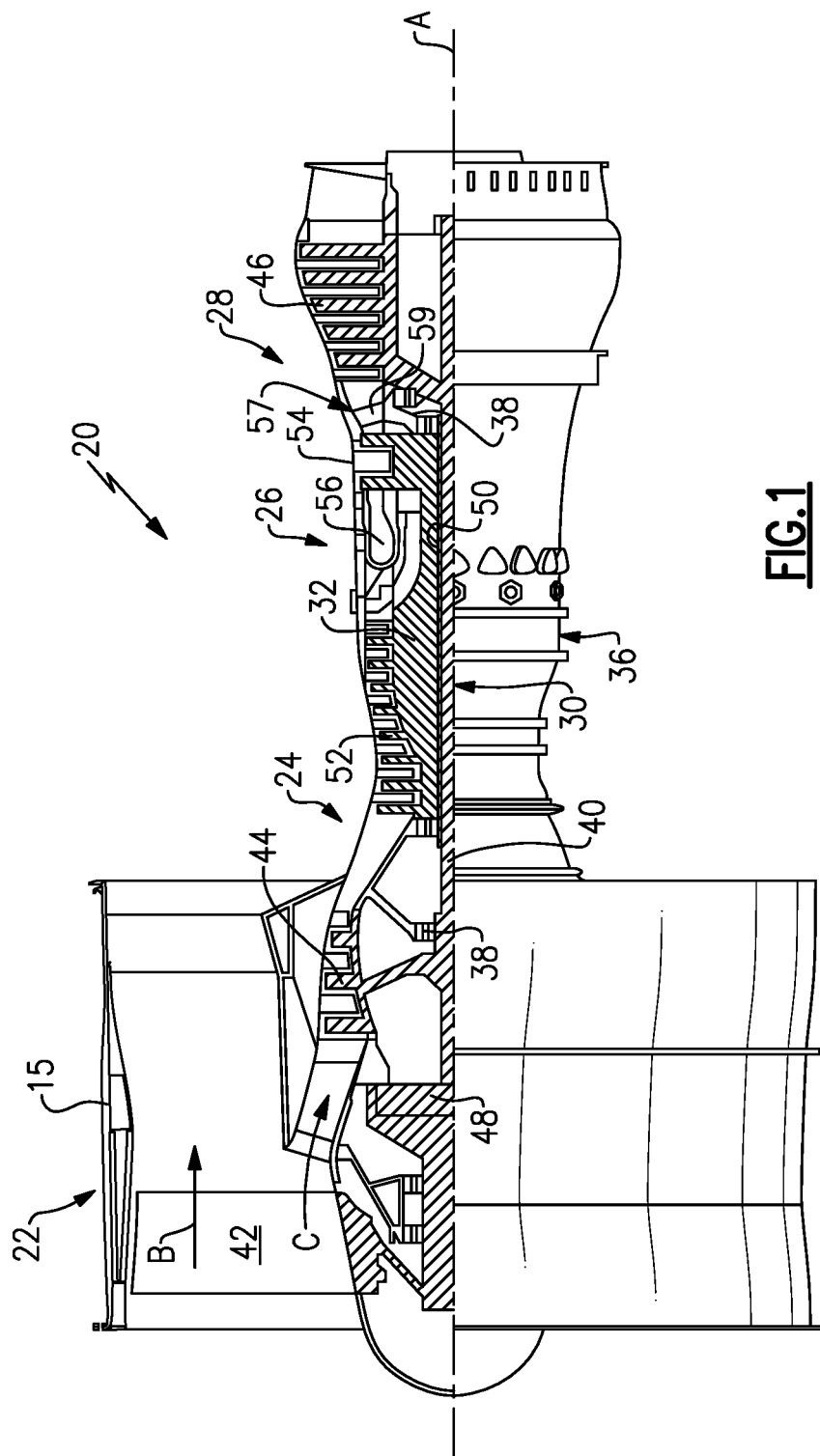
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
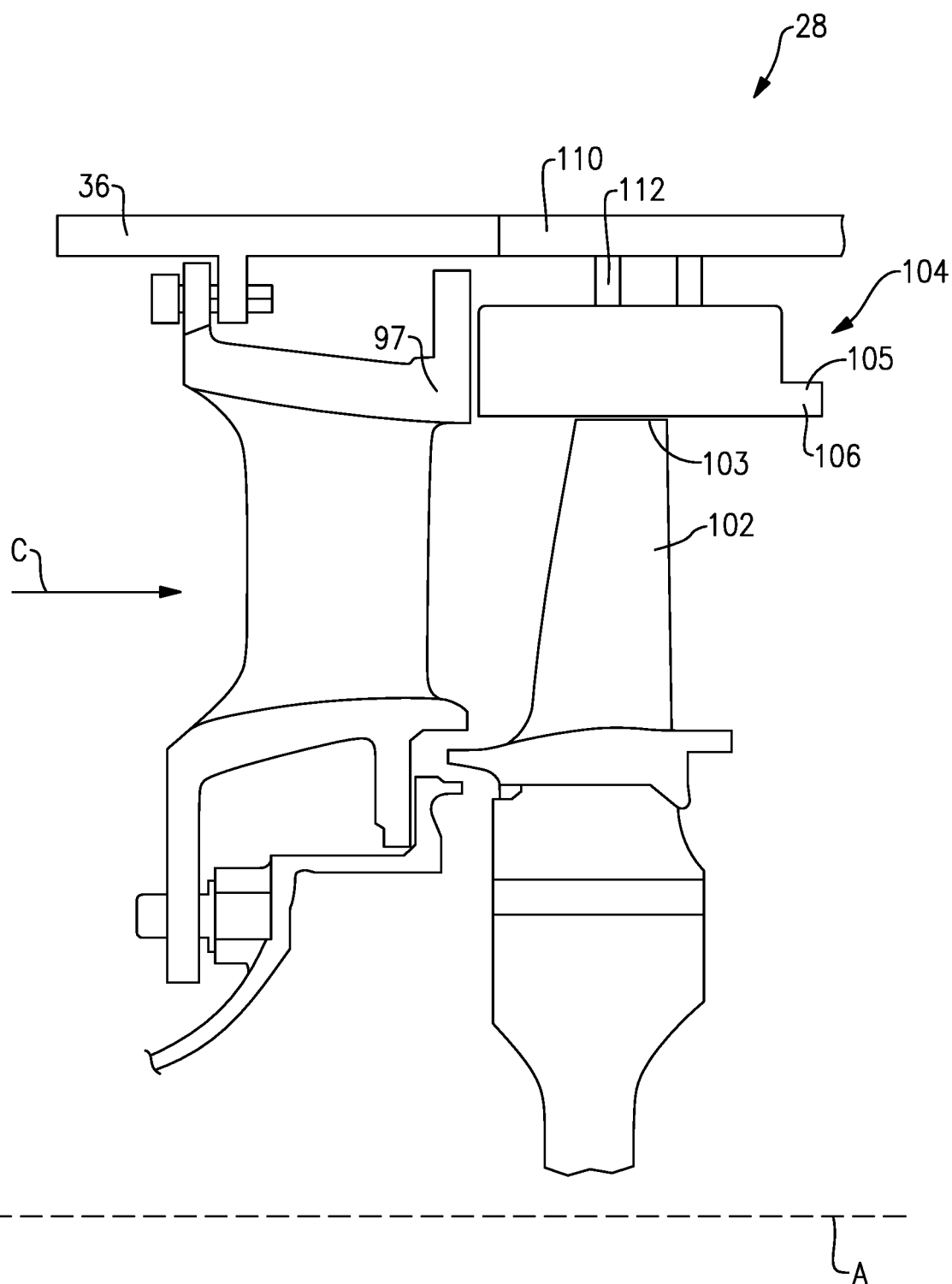
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a metallic material, such as a nickel alloy, or a ceramic material, such as a ceramic matrix composite ("CMC") or combination thereof.

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
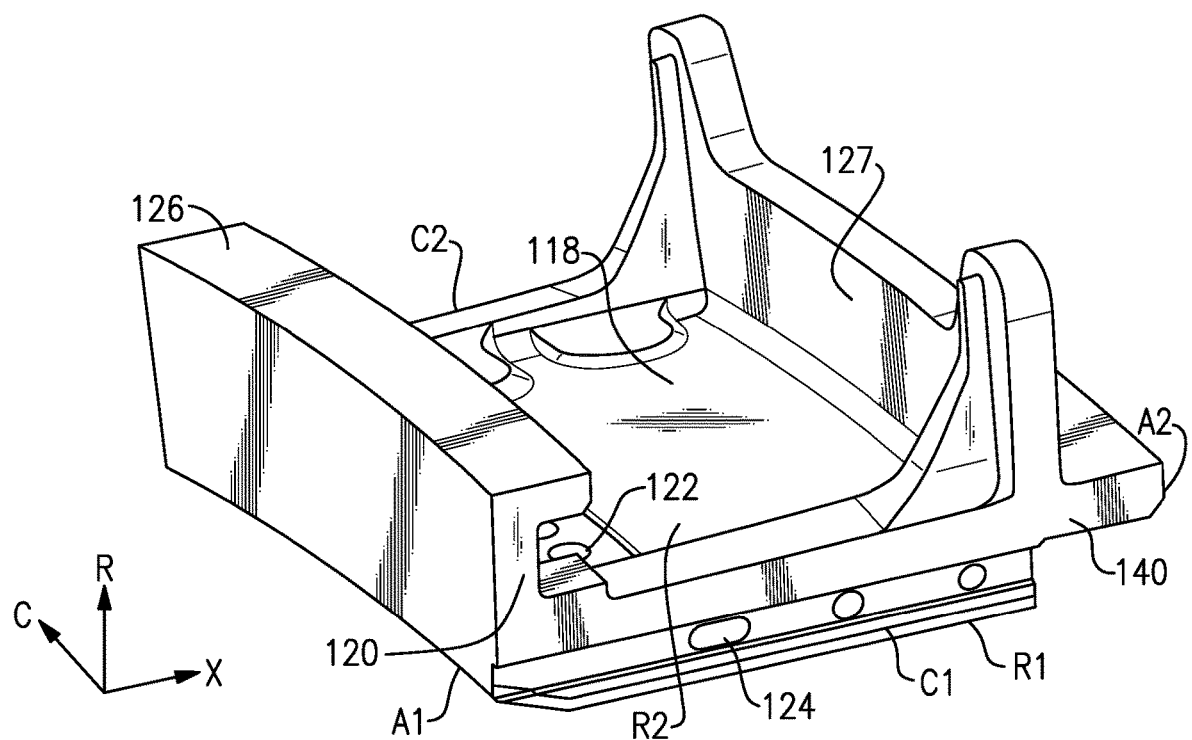
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 having a hook 126, and a second wall 127 that extend radially outward from a base portion 118. The first and second walls 120, 127 extend along the base portion 118 in a generally circumferential direction, and are axially spaced from one another. The base portion 118 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 118 may extend axially forward and/or aft of the first and second walls 120, 127 to provide a surface for sealing of the BOAS first and second axial sides A1, A2. That is, the walls 120, 127 may extend less than the full length of the seal segment 105 in the axial direction. The walls 120, 127 and hook 126 are configured to secure the seal segment 105 to the engine. In some examples, an intersegment seal may be arranged between the circumferential sides C1, C2 of adjacent seal segments 105.

The BOAS 106 may be formed of a metallic material. In one example, the BOAS 106 is cast. The BOAS 106 may be formed from a nickel alloy, for example. In some examples, the BOAS 106 may be formed from a ceramic material, such as a ceramic matrix composite ("CMC") material or a monolithic ceramic. Internal features of the BOAS 106 may be formed from a refractory metal core and/or a ceramic core. In one example, internal features are formed with an integral ceramic core.

Figure 4:
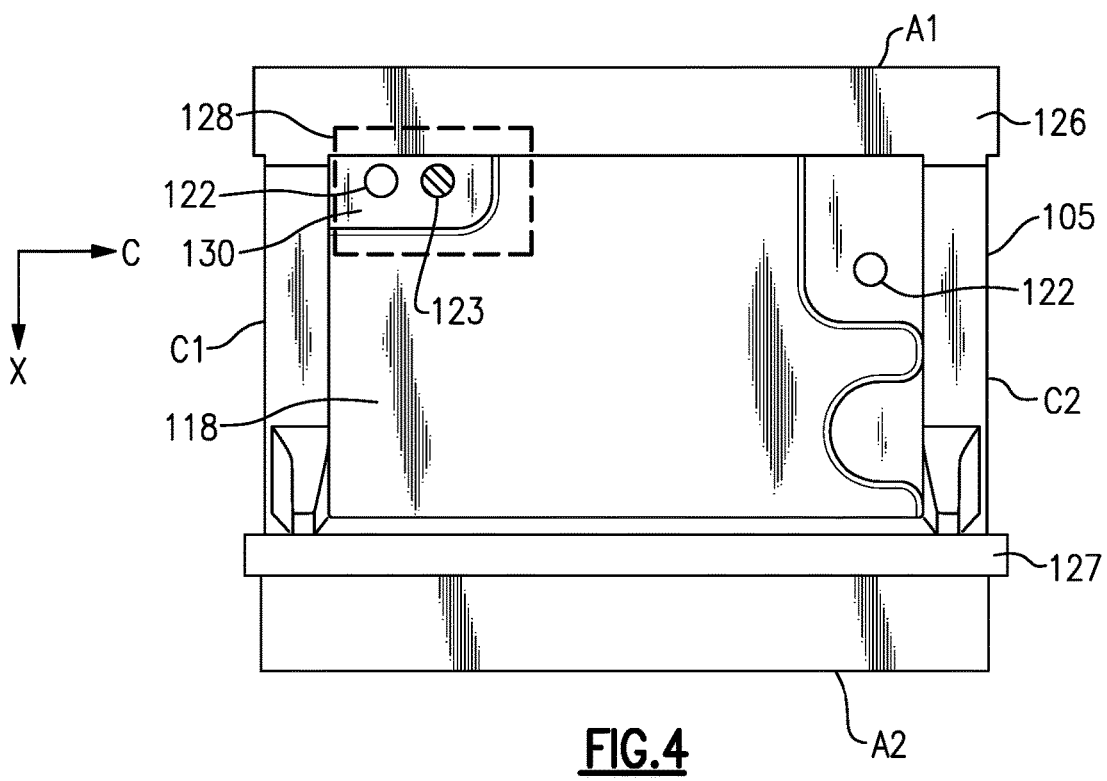
FIG. 4 illustrates a top view of the blade outer air seal of FIG. 3.

FIG. 4 illustrates a top view of the example BOAS segment 105. The BOAS segment 105 may be air-cooled or cooled using another coolant. Inlets 122, 123 provide a coolant to internal cooling passages of the BOAS segment 105. For example, bleed air may be directed to an internal cooling passage within the base portion 118 immediately outboard of the first radial surface R1. The bleed air may be directed radially through inlet 122 to an internal cooling passage network including a plurality of circumferentially extending cooling passages. The BOAS segment 105 may include multiple outlets. Exemplary outlets include outlets 124 (shown in FIG. 3) along the circumferential sides C1, C2. Lower air pressure near the outlets 124 results in the cooling air flowing from the inlet 122 towards the outlet 124.

The inlets 122, 123 may be arranged on a raised feature 130. The raised feature 130 extends radially outward from the base portion 118. The raised feature 130 may be a dome, for example. This dome 130 may provide stress reduction and improve component life.

Figure 5:
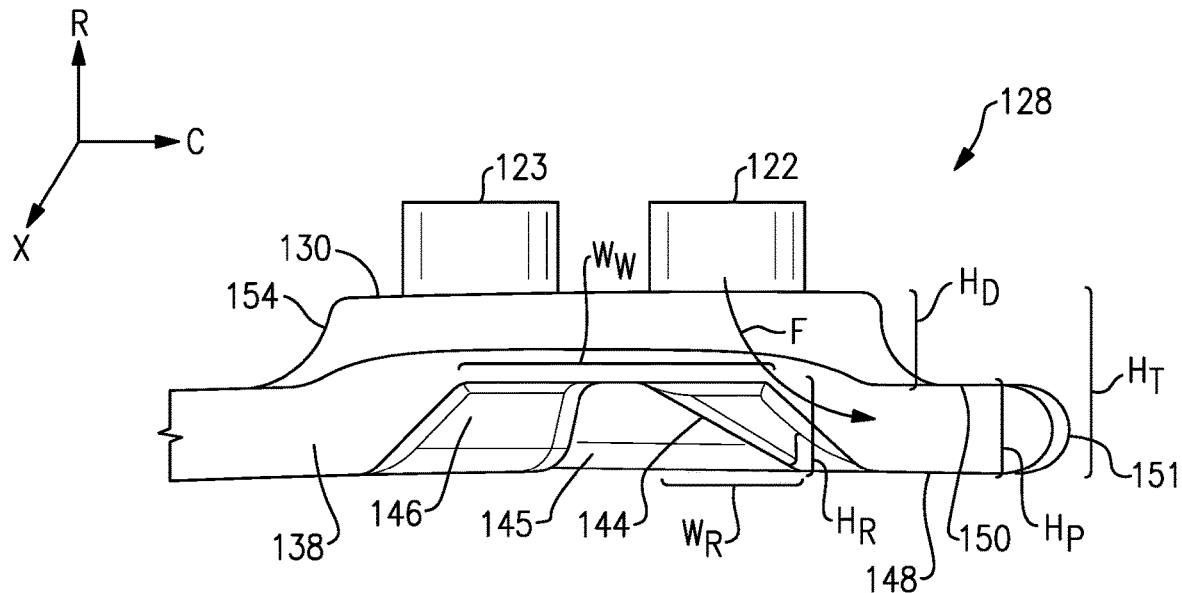
FIG. 5 illustrates an example cross sectional view of a portion of the blade outer air seal of FIG. 3.

FIG. 5 is a cross-sectional view of a portion 128 (shown in FIG. 4) of the example BOAS segment 105. The inlets 122, 123 direct a flow F of coolant into an internal cooling passage 138 within the base portion 118. The flow F travels radially inward through the inlets 122, 123, then travels generally circumferentially within the cooling passage 138. The internal cooling passage 138 is defined by a first wall 148 arranged opposite a second wall 150. In the illustrated examples, the first and second walls 148, 150 are spaced from one another in a radial direction. Although radial first and second walls 148, 150 are shown, in other examples the first and second walls 148, 150 may be oriented in a different direction. Circumferentially extending side walls 151, 153, 155 join the first and second walls 148, 150. In one example, the first wall 148 is a radially inner wall and the second wall 150 is a radially outer wall. The inner and outer walls 148, 150 define a passage height $H_P$ in the radial direction. The passage 138 may be a generally flat passage having a uniform height $H_P$. The height $H_P$ may be at least about 0.050 inches (1.27 mm), for example. The inlets 122, 123 feed the passage 138 near a closed end formed by the side wall 151.

As the cooling air passes through the passage 138, heat from the radially inner surface R1 of the BOAS 106 facing the annular flow path of the gas turbine engine 20 is absorbed by the cooling air. The heated air is then exhausted from the BOAS 106 through the outlets, and the BOAS 106 is actively cooled. Although a single cooling passage 138 is described, it should be understood that the base portion 118 may contain a network having a plurality of passages, which may have separate inlets and outlets and/or may be interconnected to one another.

The inlets 122, 123 are arranged on the dome 130, which extends radially outward of the outer wall 150. In other words, the dome 130 extends away from the cooling passage 138. The dome 130 extends a height $H_D$ beyond the outer wall 150 in the radial direction. The dome height $H_D$ may be between about 0.025-0.070 inches (0.635-17.78 mm), for example. In a further example, the dome height $H_D$ may be between about 0.03 and 0.05 inches (0.762-1.27 mm). The dome 130 may have a chamfer or fillet surface 154 surrounding the radially outermost surface of the dome 130. The dome 130 creates a portion of the cooling passage 138 having a larger height $H_T$ in the radial direction. However, the dome 130 may reduce the effectiveness of the cooling flow F impinging on the inner diameter surface 148 of the cooling passage 138.

A protrusion 145 extends into the cooling passage 138 beneath the dome 130. The protrusion 145 may offset the lowered cooling effectiveness caused by the dome 130. The protrusion 145 may include a ramped surface 144. The ramped surface 144 is generally centered beneath the inlet 123. The ramped surface 144 slopes towards the side wall 151, and is configured to direct the cooling flow F towards the closed end formed by the side wall 151. The side wall 151 is at an upstream portion of the passage 138. The protrusion 145 may have a height $H_R$ at the tallest portion in the radial direction. The height $H_R$ may be generally equal to the dome height $H_D$. The protrusion height $H_R$ may be between about 0.025-0.070 inches (0.635-1.778 mm), for example. In a further example, the protrusion height $H_R$ may be between about 0.03 and 0.05 inches (0.762-1.27 mm). The protrusion height $H_R$ may be about half of the height $H_T$. The ramped surface 144 may extend a distance $W_R$ in the circumferential direction C.

The protrusion 145 may include a wall 146 that extends generally circumferentially. The wall 146 extends generally parallel to the side walls 153, 155 of the passage 138. The wall 146 extends in the circumferential direction C a width $W_W$. The wall 146 may extend at least the width $W_R$ of the ramped surface 144. The width $W_W$ of the wall 146 may be greater than the distance $W_R$ of the ramped surface 144. The wall 146 may extend downstream of the ramped surface 144. In one example, the wall width $W_W$ may be between about 1 and 4 times the ramp width $W_R$. In an example, the ramp width $W_R$ may be between about 1.5 and about 2.5 times the ramp height $H_R$.

A plurality of turbulators 142 may be arranged on the radially inner wall 148. The turbulators 142 may be downstream of the protrusion 145, for example.

Figure 6:
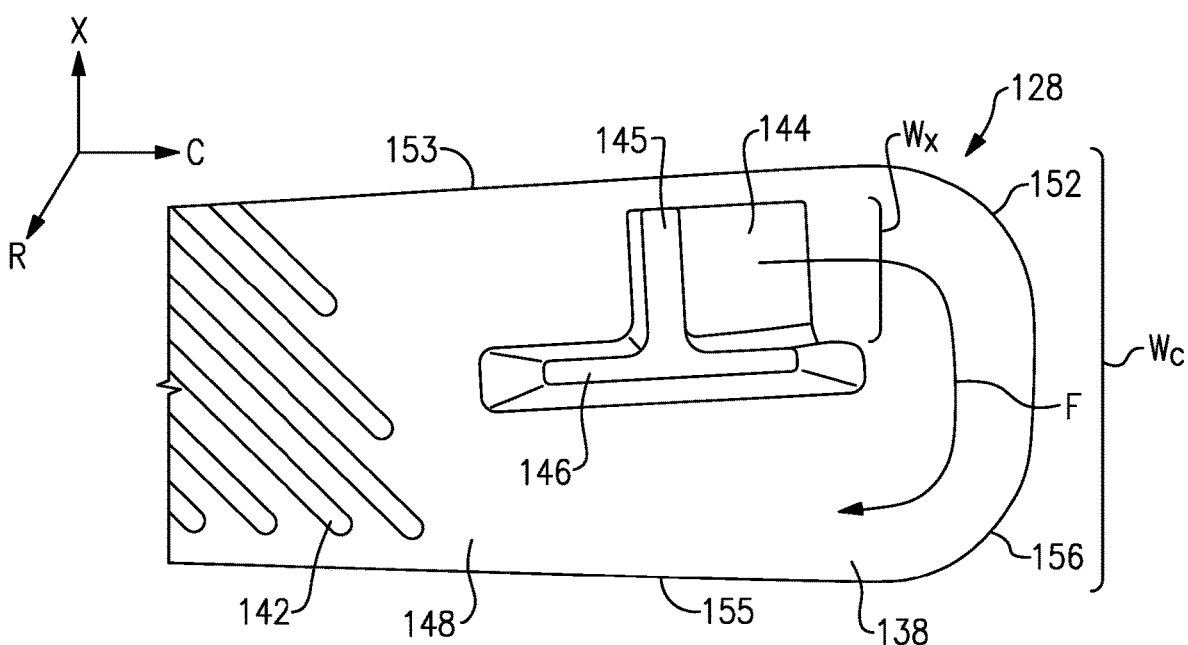
FIG. 6 illustrates an example cross sectional view of a portion of the blade outer air seal of FIG. 3.

FIG. 6 is a cross-sectional view through the portion 128 (shown in FIG. 4) of the example BOAS segment 105. This view through the cooling passage 138 shows a top view of the protrusion 145. The wall 146 may substantially centered within the cooling passage 138 in the axial direction X, in some examples. The ramped surface 144 has a width $W_X$ in the axial direction X. The cooling passage 138 has a width $W_C$ in the axial direction X. In some examples, the width $W_X$ may be between about 0.3 and 0.7 times the cooling passage width $W_C$. The protrusion 145 is configured to direct the flow F of cooling fluid towards the closed end formed by the side wall 151. The ramped surface 144 helps to ensure the cooling flow F spreads to the corners 152, 156 within the cooling passage 138. The cooling flow F is forced towards the side wall 151 by the ramped surface 144, and forced around the wall 146. This protrusion 145 thus ensures cooling air reaches the side wall 151.

The cooling passage 138, and features such as the dome 130 and protrusion 145 may be formed from an integral ceramic core within a cast metallic component, for example.

In other examples, the cooling passage 138 and internal features may be formed from a refractory metal core.

FIGS. 7A-D illustrate additional protrusion embodiments. A particular BOAS segment 105 may incorporate one or more of the described example protrusions in one or more cooling passages.

Figure 7A:
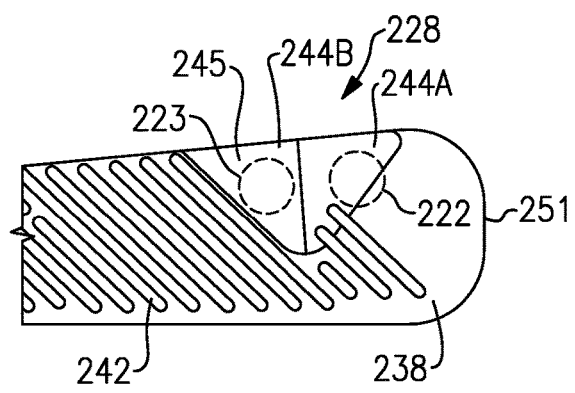
FIG. 7A illustrates a portion of another example blade outer air seal.

In FIG. 7A, the protrusion 245 has a pair of ramped surfaces 244A, 244B that direct flow from inlets 222, 223. The ramped surfaces face generally opposite directions. The first ramped surface 244A directs flow generally upstream towards the side wall 251, while the second ramped surface 244B directs flow generally downstream. In this embodiment, turbulators 242 may be arranged immediately around the protrusion 245. The turbulators 242 may extend upstream of the protrusion 245, for example.

Figure 7B:
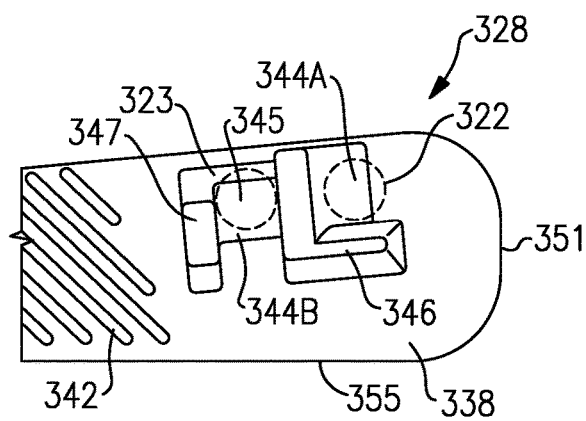
FIG. 7B illustrates a portion of another example blade outer air seal.

FIG. 7B illustrates an example protrusion 345 having a first ramped surface 344A directing fluid upstream towards the side wall 351, and a second ramped surface 344B directing fluid axially towards the side wall 355. Walls 346, 347 are arranged near the first and second ramped surfaces 344A, 344B to further direct the cooling flow.

Figure 7C:
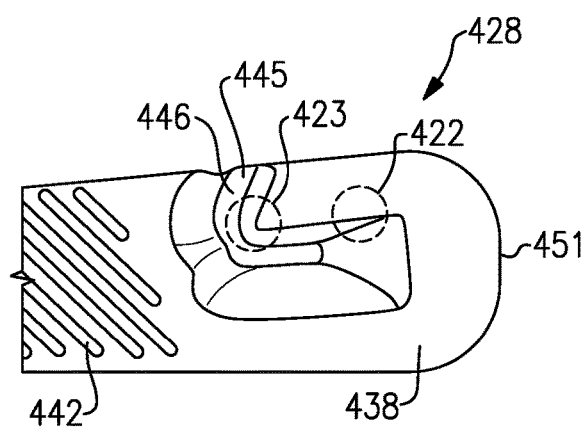
FIG. 7C illustrates a portion of another example blade outer air seal.

FIG. 7C illustrates an example protrusion 445 that is generally comprises a curved wall 446 that directs cooling flow from both inlets 422, 423 towards the end wall 451. The turbulators 442 may be arranged downstream of the protrusion 445.

Figure 7D:
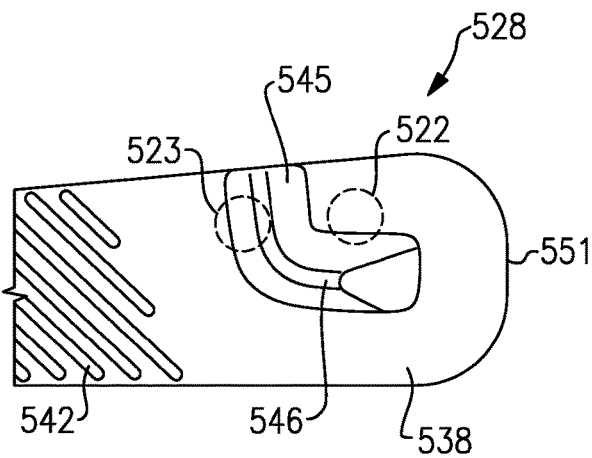
FIG. 7D illustrates a portion of another example blade outer air seal.

FIG. 7D illustrates an example protrusion 545 generally comprising a curved wall 546. In this example, the cooling flow from inlet 523 is directed towards the end wall 551 by the wall 546, while the cooling flow from inlet 522 is directed downstream towards the turbulators 542.

The disclosed cooling passage arrangement may improve coolant fill characteristics at the inlet end of the cooling passage. The inlet dome may reduce stress and improve component life, but may poorly impact the coolant fill at the inlet end of the component. The disclosed ramp features under the inlet hole directs flow toward the cooling passage inlet end. The wall parallel to the cooling passage side walls discourages flow across the cooling passage without washing around the end wall.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine component comprising:
a main body;
a cooling passage within the main body, the cooling passage defined by a first wall opposite a second wall, the cooling passage having a passage height between the first wall and the second wall, the cooling passage having an inlet on the second wall wherein the inlet is arranged on a dome on the second wall, the dome extending outward relative to the cooling passage, the dome defining a portion of the cooling passage having a second passage height that is larger than the passage height; and
a protrusion formed on the first wall arranged across from the inlet, wherein the dome has a first height and the protrusion has a second height, the first height is substantially the same as the second height.

2. The component of claim 1, wherein the first wall is a radially inner wall and the second wall is a radially outer wall.

3. The component of claim 1, wherein the protrusion extends inward relative to the cooling passage.

4. The component of claim 1, wherein the protrusion comprises a ramp feature having a sloped surface.

5. The component of claim 4, wherein the cooling passage defines an upstream end and a downstream end, and the ramp feature is configured to direct cooling fluid towards the upstream end.

6. The component of claim 5, wherein the sloped surface faces toward the upstream end.

7. The component of claim 5, wherein the ramp feature has a length in a circumferential direction and a wall extends along the length of the ramp feature.

8. The component of claim 7, wherein the wall extends downstream of the ramp feature.

9. The component of claim 1, wherein the passage height between the first and second walls is at least 0.050 inches (1.27 mm).

10. The component of claim 1, wherein a plurality of turbulators are arranged on one of the first and second walls downstream of the protrusion.

11. The component of claim 1, wherein the component is a blade outer air seal.

12. The component of claim 4, wherein the ramp feature has a ramp width in a circumferential direction and a ramp height in a radial direction, and the ramp width is between 1.5 and 2.5 times the ramp height.

13. The component of claim 5, wherein the ramp feature is configured to direct cooling fluid into a corner within the cooling passage.

14. A turbine section for a gas turbine engine, comprising:
a turbine blade extending radially outwardly to a radially outer tip and for rotation about an axis of rotation;
a blade outer air seal having a plurality of segments mounted in a support structure, the plurality of segments arranged circumferentially about the axis of rotation and radially outward of the outer tip; and
at least one segment of the plurality of segments having an internal cooling passage defined by a first wall opposite a second wall, the cooling passage having a passage height between the first wall and the second wall, the internal cooling passage having an inlet on the second wall and a protrusion formed in the first wall across from the inlet wherein the inlet is arranged on a dome on the second wall, the dome extending outward relative to the cooling passage, the dome defining a portion of the cooling passage having a second passage height that is larger than the passage height, wherein the dome extends a first height from the second wall and the protrusion extends a second height from the first wall, the first height being substantially the same as the second height.

15. The turbine section of claim 14, wherein the first wall is a radially inner wall and the second wall is a radially outer wall.

16. The turbine section of claim 14, wherein the first and second heights are between 0.03 and 0.05 inches (0.762-1.27 mm).

17. The turbine section of claim 14, wherein the inlet is arranged in a forward portion of the at least one segment of the plurality of segments.

18. The turbine section of claim 14, wherein the cooling passage defines an upstream end and a downstream end, and the protrusion is a ramp feature configured to direct cooling fluid towards the upstream end.

* * * * *